United States Patent
Foley

[11] Patent Number: 5,842,503
[45] Date of Patent: Dec. 1, 1998

[54] INTEGRALLY FORMED AIR FLOW VALVE

[75] Inventor: Dennis D. Foley, Concord Township, Ohio

[73] Assignee: The Excello Specialty Company, Cleveland, Ohio

[21] Appl. No.: 911,111

[22] Filed: Aug. 14, 1997

Related U.S. Application Data

[60] Provisional application No. 60/024,102, Aug. 16, 1996.
[51] Int. Cl.$^6$ .................................................. F16K 15/00
[52] U.S. Cl. ........................ 137/512.4; 137/843; 454/162
[58] Field of Search ............................... 137/512.4, 843; 454/162, 164, 165, 353, 359, 259

[56] References Cited

U.S. PATENT DOCUMENTS

| | | | |
|---|---|---|---|
| 2,675,823 | 4/1954 | Langdon | 137/512.4 |
| 3,490,488 | 1/1970 | Grist | 137/512.4 |
| 3,930,096 | 12/1975 | Gilpatrick | 137/843 |
| 5,000,216 | 3/1991 | Smith | 137/512.4 |
| 5,492,505 | 2/1996 | Bell et al. | 454/162 |

*Primary Examiner*—Denise L. Ferensic
*Assistant Examiner*—Joanne Y. Kim
*Attorney, Agent, or Firm*—Fay, Sharpe, Beall, Fagan, Minnich & McKee

[57] ABSTRACT

A region in a thin plastic sheet is formed to include a series of corrugations. These corrugations are include alternating peaks or crests and roots or valleys. The plastic sheet is to be installed on a workpiece intermediate areas or zones periodically exposed to differential air pressures. Slit areas incorporated into adjacent crests of the corrugations to extend along a longitudinal portion thereof allow air flow passage therethrough in one direction while preventing air flow in the other direction.

8 Claims, 1 Drawing Sheet

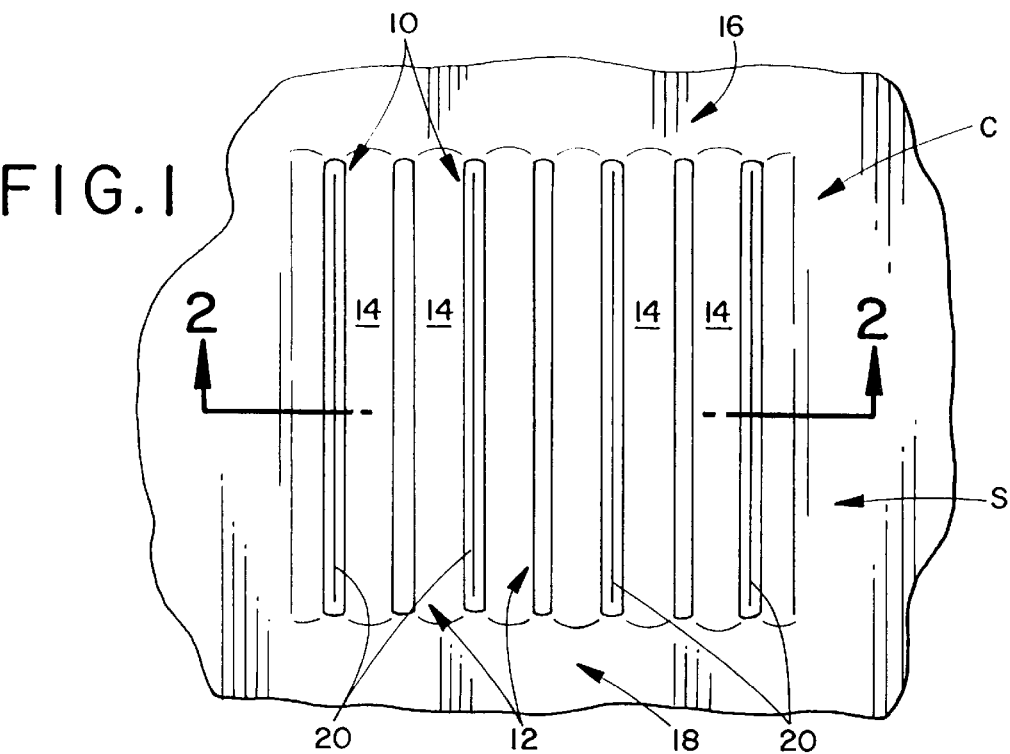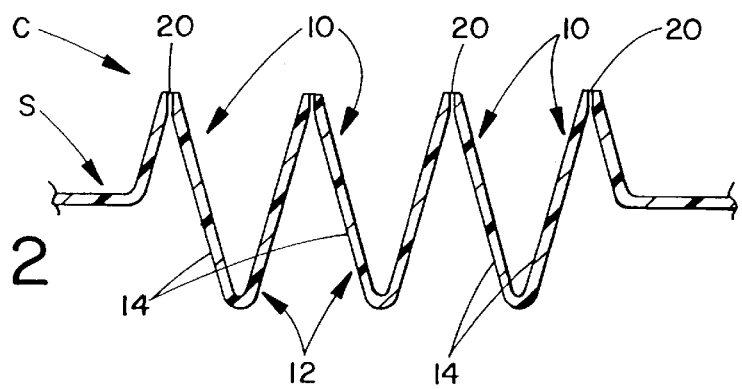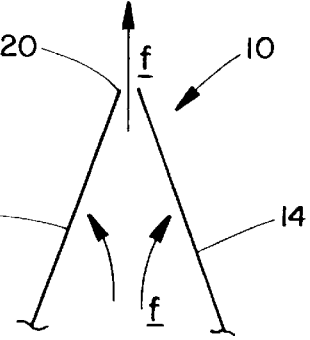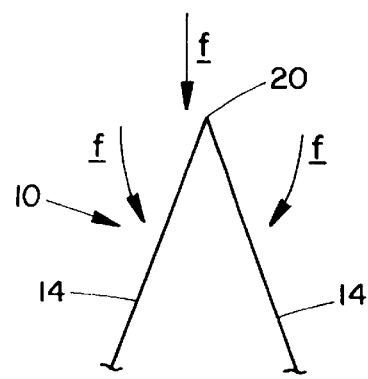

INTEGRALLY FORMED AIR FLOW VALVE

BACKGROUND OF THE INVENTION

This invention relates generally to air flow control devices and, in particular, to a flapper or check type valve integrally formed in a thin sheet of plastic material. The invention finds particular use in automotive type vehicles where differential air pressures are often encountered as between the interior and exterior of the vehicle. Such differences are most noticeable when, for example, a door or trunk in the open position is quickly moved to a closed position. This differential in air pressure can be quite discomforting to persons sitting in the vehicle at the time of such closing.

The foregoing difficulties have long been recognized and a number of solutions have been previously suggested. Present practice in the automotive industry involves use of more conventional flapper type valves located at strategic positions in the vehicle body to facilitate substantially instantaneous release of air pressure as vehicle doors are closed to thereby eliminate occupant discomfort. Such flapper valves have included a variety of alternative designs including, merely by way of example, a small plastic frame having an inexpensive flapper type arrangement mounted therein and flapper arrangements secured over openings in the door watershields or other protective sheets. Many other arrangements are also available which satisfactorily accommodate differential air pressures in vehicles. However, all of these products and arrangements have added some additional cost to the vehicle, either by way of the cost of the air flow valve itself or in additional time required during vehicle assembly.

Accordingly, it has been considered desirable to develop an air flow valve to address the foregoing difficulties and others, and wherein a cost savings could be realized. The subject invention is deemed to meet these needs and others, and provide an air flow valve which is simple to manufacture and has a variety of potential applications both inside and outside of the automotive or vehicle environment.

SUMMARY OF THE INVENTION

The present development provides an air flow valve arrangement which is integrally formed in a corrugated area or region of a thin plastic sheet. When installed between areas of differential air pressures, the air flow valve will accommodate air flow therethrough in one direction while blocking air flow therethrough in the other direction. The arrangement is particularly applicable to the automotive industry and finds beneficial use therein to substantially reduce or eliminate the discomfort which occupants of vehicles oftentimes encounter, particularly when an open door or trunk is rapidly closed. There are a variety of locations in vehicles where protective shields are or may be installed to prevent dirt, water and the like from penetrating the vehicle interior. While these shields or protectors have previously been constructed of a variety of materials, a very successful approach which has been developed and implemented involves constructing such items from plastic sheet material in the manner shown and described in, for example, U.S. Pat. Nos. 4,696,848 and 4,865,791.

The foregoing two patents disclose the concept of forming corrugations in plastic sheets to provide pockets or other relief areas to accommodate bulges, radio speakers, and the like in an vehicle doors. While the original conformation of these corrugated regions was circular, the capabilities for forming corrugations in plastic sheet material have been further refined to accommodate a variety of different shapes and conformations. This basic technology has now been improved commensurate with the concepts of the subject development to provide an integrally formed air flow or check valve.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 1 comprises a plan view of an air flow valve formed in accordance with concepts of the subject invention;

FIG. 2 is a cross-sectional view taken along lines 2—2 of FIG. 1;

FIG. 3 is a schematic showing operation of the subject air flow valve in accommodating a flow of air in one direction therethrough; and, FIG. 4 is another schematic showing the valve in a closed position for preventing a flow of air therethrough in the opposite direction.

DETAILED DESCRIPTION OF THE INVENTION

Referring now to the FIGURES wherein the showings are for purposes of illustrating a preferred embodiment of the invention only and not for limiting same, FIG. 1 shows a thin plastic sheet S which has a plurality of spaced apart, generally parallel corrugations C formed therein. While a variety of different plastic materials could be used, polyethylene plastic has been found to be particularly suitable. Moreover, the manner of forming corrugations C does not itself form a specific part of the present development, although one method of such formation is described in, for example, U.S. Pat. No. 4,865,791.

As shown in FIGS. 1 and 2, corrugations C are essentially comprised of alternating crest of peak areas 10 and root or valley areas 12 interconnected by continuous wall or leg areas 14. The corrugations themselves extend between spaced apart end areas 16, 18. It is to be appreciated that other conformations of the corrugations could also be used without in any way departing from the overall intent or scope of the development.

In accordance with the invention, each of crest areas 10 includes a slit 20 extending at least partially therealong between end areas 16, 18. These slits form the basis of the subject new air flow valve. Depending upon the particular use and amount of air flow required, the length of the slits may be varied as deemed necessary and appropriate. Moreover, a greater or lesser number of individual corrugations C may be included as dictated by the particular use and air flow requirements. Slits 20 may be formed by convenient means during formation of the corrugations or subsequent thereto.

Merely by way of example, and presuming that the subject air flow valve has been incorporated into a watershield for a vehicle door, the watershield is mounted to the vehicle so that crest areas 10 are spaced remote from the interior of the vehicle and root areas 12 are spaced closest to the interior of the vehicle. With such mounting, when a door or trunk is abruptly closed, the sudden increase in air pressure will cause air flow travel or pressure in direction f as shown in FIG. 3 toward the crest areas 10 and outwardly through slits 20. The differential air pressure f causes side walls 14 to balloon or expand slightly apart from each other, thus opening slits 20. Once the internal and air pressures have reached equilibrium, the natural resiliency of legs 14 causes slits 20 to effectively close and thereby prevent further air flow.

FIG. 4 shows operation of the air flow valve when the external pressure is greater than the internal pressure. There, the differential air pressure will cause air flow in direction f. In that event, air flow or pressure f will act against corrugation side walls 14 to effectively maintain slits 20 in a closed condition. This, then, prevents air flow from externally of the vehicle to the vehicle interior. Thus, the desired one way air flow is effectively achieved, and the means employed may be inexpensively achieved through integral formation of the valve in a watershield or other protective cover.

While the subject new invention has been described with reference to watershields, it will be appreciated that it has broader applications and may be adapted to use with other vehicle components or protectors, or to applications in environments outside the automotive field. For example, slits 20 could be included in both the corrugation crests and roots. Such arrangement would then accommodate air flow through the valve whenever there is a difference in pressure on either side of the valve.

The invention has been described with reference to the preferred embodiments. Obviously, modifications and alterations will occur to others upon a reading and understanding of the preceding specification. It is intended that the invention be construed as including all such modifications and alterations insofar as they come within the scope of the appended claims or the equivalents thereof.

Having thus described the preferred embodiments, the invention is now claimed to be:

1. An airflow valve comprising:
    a flexible sheet including a corrugated area formed therein, said corrugated area including a plurality of corrugations defined by alternating peak areas and valley areas interconnected by wall areas, at least one of said peak areas including a slit formed therealong and through said sheet, said slit allowing airflow through said sheet in a first direction from said valley areas toward said peak areas, while at least substantially blocking airflow through said sheet in a second direction from said peak areas toward said valley areas.

2. The airflow valve as set forth in claim 1 wherein said sheet is made from a plastic.

3. The airflow valve as set forth in claim 1 wherein said plurality of corrugations extend between spaced apart end areas, and wherein a plurality of said peak areas include a slit extending at least partially therealong between said end areas and though said sheet, said slits together allowing airflow in said first direction through said sheet and at least substantially blocking airflow through said sheet in said second direction.

4. A one-way valve structure comprising:
    a sheet material including a plurality of peak areas defined therein separated by valley areas, wherein adjacent peak and valley areas are interconnected by side walls so that said peak areas, said valley areas, and said side walls define a corrugated area in said sheet, wherein a plurality of said peak areas further include at least one elongated slit extending along at least a portion of the length thereof and through said sheet such that airflow in a first direction relative to said sheet forces said side walls apart to open said slits for allowing airflow therethrough, and such that airflow in a second direction generally opposite to said first direction closes said slits to impede airflow therethrough.

5. The one-way valve structure as set forth in claim 4 wherein said sheet is comprised of a flexible plastic material.

6. The one-way valve structure as set forth in claim 4 wherein said peak areas and valley areas extend between spaced apart end areas.

7. The one-way valve structure as set forth in claim 6 wherein said peak areas and said valley areas extend generally parallel to each other between said spaced apart end areas.

8. A method of sealing and limiting air pressure in an enclosure having at least one airflow exit, said method including:
    providing a plastic sheet having a corrugated area formed therein, said corrugated area including at least one peak area defined by converging side walls formed in said plastic sheet, said peak area including at least one normally closed airflow slit formed therethrough;
    positioning said plastic sheet to extend across said airflow exit such that said peak area is spaced remote from said enclosure, said plastic sheet at least substantially blocking the entrance of fluid into said enclosure through said airflow exit;
    whereby an air pressure increase in said enclosure relative to air pressure exterior of said enclosure acts on said side walls of said peak area to effectively open said slit such that air passes therethrough and exits said enclosure.

\* \* \* \* \*